United States Patent
Hashimoto et al.

(10) Patent No.: US 8,190,333 B2
(45) Date of Patent: May 29, 2012

(54) VEHICLE CONTROL APPARATUS AND CONTROL METHOD THEREOF

(75) Inventors: Syuzo Hashimoto, Toyota (JP); Morio Sakai, Toyota (JP)

(73) Assignees: Toyota Jidosha Kabushiki Kaisha, Toyota (JP); Aisin Seiki Kabushiki Kaisha, Kariya-Shi (JP)

( * ) Notice: Subject to any disclaimer, the term of this patent is extended or adjusted under 35 U.S.C. 154(b) by 0 days.

(21) Appl. No.: 13/126,073

(22) PCT Filed: Nov. 26, 2009

(86) PCT No.: PCT/IB2009/007564
§ 371 (c)(1),
(2), (4) Date: Apr. 26, 2011

(87) PCT Pub. No.: WO2010/061277
PCT Pub. Date: Jun. 3, 2010

(65) Prior Publication Data
US 2011/0218713 A1    Sep. 8, 2011

(30) Foreign Application Priority Data

Nov. 27, 2008    (JP) .................................. 2008-302270

(51) Int. Cl.
*B60N 2/02* (2006.01)
(52) U.S. Cl. ............. 701/49; 701/45; 180/268; 180/272
(58) Field of Classification Search .................... 701/36, 701/45, 49; 180/268, 271; 296/216.1, 216.11, 296/216.12, 216.13, 216.14, 216.15, 216.16, 296/216.17
See application file for complete search history.

(56) References Cited

U.S. PATENT DOCUMENTS

| | | | | | |
|---|---|---|---|---|---|
| 4,467,252 | A | * | 8/1984 | Takeda et al. | 318/603 |
| 5,670,853 | A | * | 9/1997 | Bauer | 318/286 |
| 6,240,352 | B1 | * | 5/2001 | McCurdy | 701/45 |
| 6,830,123 | B2 | * | 12/2004 | Ohki et al. | 180/326 |
| 6,949,904 | B2 | * | 9/2005 | Rumney | 318/565 |
| 7,031,814 | B2 | * | 4/2006 | Kawato et al. | 701/45 |
| 7,051,830 | B2 | * | 5/2006 | Enomoto | 180/274 |
| 7,178,622 | B2 | * | 2/2007 | Eberle et al. | 180/271 |

(Continued)

FOREIGN PATENT DOCUMENTS

EP    1 609 664 A3    12/2005

(Continued)

OTHER PUBLICATIONS

Japanese Office Action dated Oct. 28, 2010 issued in Japanese Patent Application No. 2008-302270 (with partial translation).

(Continued)

*Primary Examiner* — Thomas Black
*Assistant Examiner* — Peter D Nolan
(74) *Attorney, Agent, or Firm* — Oliff & Berridge, PLC

(57) ABSTRACT

A vehicle control apparatus includes a drive unit that drives a mechanism provided in a vehicle, an operating portion that is operated by an occupant and instructs the drive unit to drive, a collision predicting portion that predicts a collision, and a control portion that controls the drive unit. The control portion controls the drive unit to place the mechanism in a predetermined state when the collision is predicted by the collision predicting portion, and controls the drive unit to vary a driving speed of the drive unit when the operating portion is operated while the drive unit is being controlled. The invention also relates to a control method of this vehicle control apparatus.

2 Claims, 6 Drawing Sheets

U.S. PATENT DOCUMENTS

| | | | |
|---|---|---|---|
| 7,200,474 B2 * | 4/2007 | Motozawa et al. | 701/45 |
| 7,353,905 B2 * | 4/2008 | Eberle et al. | 180/271 |
| 7,369,928 B2 * | 5/2008 | Wang et al. | 701/49 |
| 7,479,749 B2 * | 1/2009 | Gerding et al. | 318/469 |
| 7,644,799 B2 * | 1/2010 | Friedman et al. | 180/282 |
| 7,755,233 B2 * | 7/2010 | Reimann et al. | 310/75 R |
| 2005/0071053 A1 * | 3/2005 | Yamada et al. | 701/1 |
| 2005/0131606 A1 | 6/2005 | Motozawa et al. | |
| 2006/0001298 A1 * | 1/2006 | Tsuruta et al. | 297/216.16 |
| 2006/0195231 A1 | 8/2006 | Diebold et al. | |
| 2007/0185635 A1 * | 8/2007 | Mattes et al. | 701/45 |
| 2008/0162002 A1 * | 7/2008 | Bacher et al. | 701/45 |

FOREIGN PATENT DOCUMENTS

| | | |
|---|---|---|
| EP | 1 612 095 A3 | 1/2006 |
| JP | A-63-106149 | 5/1988 |
| JP | A-2005-178443 | 7/2005 |
| JP | A-2006-8026 | 1/2006 |
| JP | A-2006-139707 | 6/2006 |
| JP | A-2007-500650 | 1/2007 |
| JP | A-2007-276715 | 10/2007 |
| WO | WO 2004/085220 A1 | 10/2004 |
| WO | WO 2004/103779 A1 | 12/2004 |

OTHER PUBLICATIONS

International Search Report mailed Apr. 8, 2010 issued in International Patent Application No. PCT/IB2009/007564.

Written Opinion of the International Searching Authority mailed Apr. 8, 2010 issued in International Patent Application No. PCT/IB2009/007564.

International Preliminary Report on Patentability completed Jan. 25, 2011 issued in International Patent Application No. PCT/IB2009/007564.

* cited by examiner

US 8,190,333 B2

VEHICLE CONTROL APPARATUS AND CONTROL METHOD THEREOF

BACKGROUND OF THE INVENTION

1. Field of the Invention

The invention relates to a vehicle control apparatus, and more particularly, to a vehicle control apparatus and control method thereof that controls a mechanism provided in a vehicle during a vehicle emergency.

2. Description of the Related Art

Various vehicle control apparatuses, such as one that performs control to close power windows or a sun roof during an emergency such as a collision, and one that adjusts the seat back angle of a vehicle seat, have been proposed.

For example, Japanese Patent Application Publication No. 2005-178443 (JP-A-2005-178443) proposes a vehicle seat control apparatus that controls a vehicle seat during a vehicle emergency.

The technology described in JP-A-2005-178443 is a vehicle control apparatus that predicts a collision with the rear of the host vehicle and adjusts the seat back to the upright position in response to a prediction signal. Also with the technology described in JP-A-2005-178443, the upright angle of the seat back is adjusted faster when a prediction signal is received than it is when an operation signal from a manual operating portion is received.

However, with the technology in JP-A-2005-178443, once the seat back starts to be adjusted in response to the prediction signal, closed-loop control is performed to adjust the angle of the seat back until it is vertical. As a result, it may be annoying if the seat back operates in a manner unintended by the user, so there is room for improvement.

SUMMARY OF THE INVENTION

This invention therefore provides a vehicle control apparatus and control method thereof which is able to drive a drive unit as intended by the user, and thus minimize annoyance caused by the drive unit continuing to be driven at an unintended speed.

Thus, one aspect of the invention relates to a vehicle control apparatus that includes a drive unit that drives a mechanism provided in a vehicle, an operating portion that is operated by an occupant and instructs the drive unit to drive, a collision predicting portion that predicts a collision, and a control portion that controls the drive unit. The control portion controls the drive unit to place the mechanism in a predetermined state when the collision is predicted by the collision predicting portion, and controls the drive unit to vary the driving speed of the drive unit when the operating portion is operated while the drive unit is being controlled.

According to this vehicle control apparatus, the mechanism provided in the vehicle is driven by the drive unit. This drive unit may be, for example, a unit for driving a reclining mechanism used to adjust a reclining angle of a seat back of a vehicle seat, or a unit for driving a mechanism of an opening portion such as a power window or a sun roof. Further, driving of the drive unit is dictated by operation of the operating portion.

The collision predicting portion predicts a collision. The control portion controls the drive unit to place the mechanism provided in the vehicle in a predetermined state when a collision is predicted by the collision predicting portion. For example, the control portion may adjust the seat back to a preset reclining angle or close a power window or a sun roof.

The control portion controls the drive unit to vary its driving speed when the operating portion is operated while the drive unit is being controlled. Accordingly, the speed of the drive unit can be varied when the drive unit is driven at an unintended speed. As a result, it is possible to drive the drive unit as intended by the user, and thus minimize annoyance caused by the drive unit continuing to be driven at an unintended speed.

The control portion may stop driving the drive unit when the operating portion is operated while the drive unit is being controlled. That is, unintended driving of the drive unit can be stopped, so annoyance to the user can be minimized.

Also, the control portion may control the drive unit at a first speed when the collision predicting portion predicts the collision, and decrease the driving speed of the drive unit to a second speed that is slower than the first speed when the operating portion is operated while the drive unit is being driven at the first speed. That is, the driving speed of the drive unit is decreased in a stepped manner, so annoyance to the user can be minimized.

Further, the drive unit may be structured so as to be able to drive in a first direction and a second direction that is opposite the first direction. Incidentally, in this specification, the first direction refers to the direction before the direction in which the drive unit is operating has been reversed, and the second direction refers to the direction after the direction in which the drive unit is operating has been reversed. At that time, the control portion may control so as to reverse a driving direction of the drive unit to the second direction after decreasing the driving speed of the drive unit from the first speed to the second speed, when there is a drive command to drive the drive unit in the second direction in response to operation of the operating portion while the drive unit is being driven in the first direction at the first speed. As a result, when approaching the drive unit to the state before being driven, the drive unit can be slowed, and reversed by a control sequence, which enables the operation to be simplified.

As described above, according to this aspect of the invention, it is possible to drive the drive unit as intended by the user, and thus minimize annoyance caused by the drive unit continuing to be driven at an unintended speed, even while the drive unit is being controlled. Also, the invention also relates to a control method of this vehicle control apparatus.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

Figure 1:
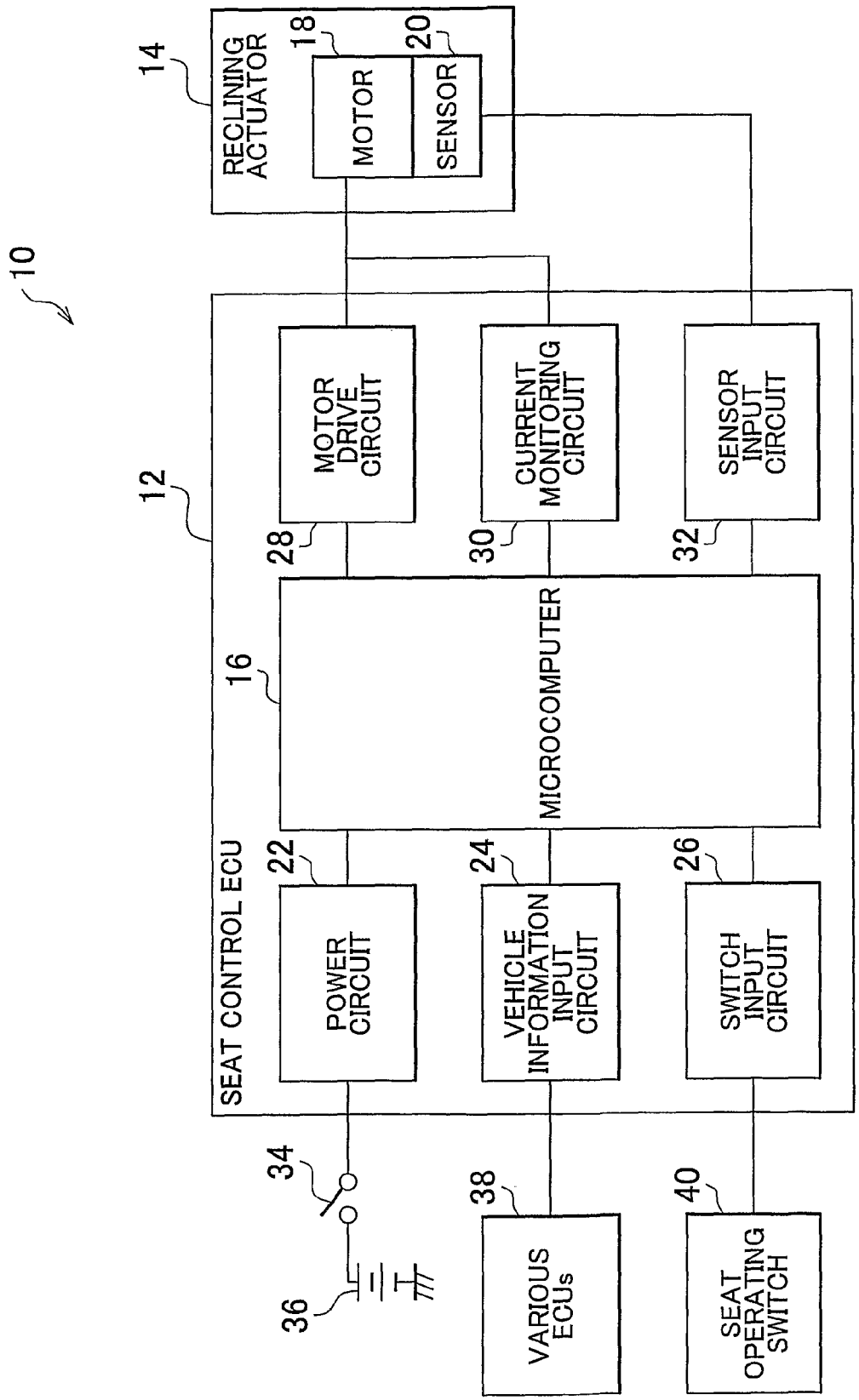
FIG. 1 is a block diagram of the general structure of a vehicle seat control apparatus according to a first embodiment of the invention.
Figure 2A:
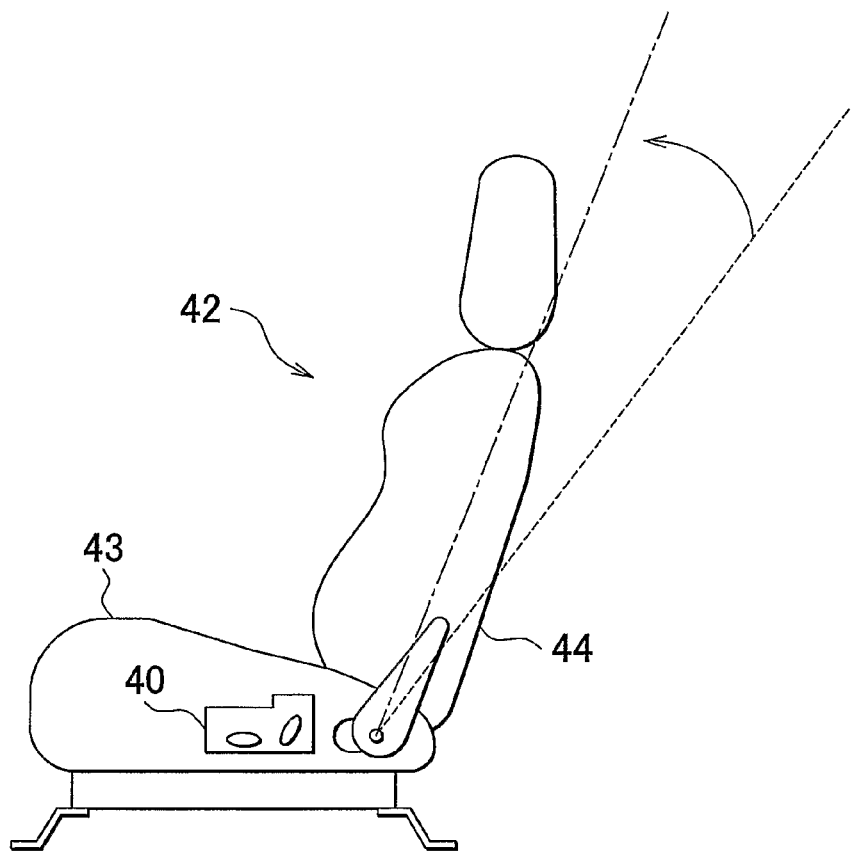
FIG. 2A is a view of one example of an arrangement of a seat operating switch.
Figure 2B:
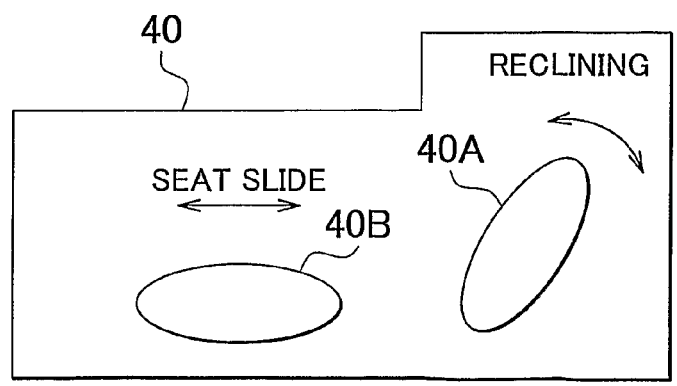
FIG. 2B is a view of one example of the seat operating switch.

A first embodiment of the present invention will be described in greater detail below with reference to the accompanying drawings. FIG. 1 is a block diagram of the general structure of a vehicle seat control apparatus, FIG. 2A is a view of one example of an arrangement of a seat operating switch in a vehicle seat 42, and FIG. 2B is a view of one example of the seat operating switch.

A vehicle seat control apparatus 10 includes a seat control ECU 12 (i.e., a control portion) for performing drive control of a seat back 44 of the vehicle seat 42, and a reclining actuator 14 (i.e., a drive unit) for adjusting the reclining angle of the seat back 44 with respect to a seat cushion 43 (i.e., the angle between the seat back 44 and the seat cushion 43) by driving a reclining mechanism (i.e., a mechanism) of the vehicle seat 42.

The seat control ECU 12 includes a microcomputer 16 that has a CPU, ROM, RAM, and an input/output interface. The reclining actuator 14 includes a motor 18 and a sensor 20 for detecting the position (i.e., the reclining angle) of the seat back 44. Incidentally, the sensor 20 detects the reclining angle of the seat back 44 by detecting the rotation speed and rotational position and the like of the motor 18 using a Hall element, for example.

A power circuit 22, a vehicle information input circuit 24, a switch input circuit 26, a motor drive circuit 28, a current monitoring circuit 30, and a sensor input circuit 32 are connected to the microcomputer 16.

The power circuit 22 is connected to a battery 36 via a switch 34 and supplies power from the battery 36 to the microcomputer 16 and the like.

The vehicle information input circuit 24 is connected to various ECUs 38 that perform various control of the vehicle, so as to be able to communicate with those various ECUs 38.

The switch input circuit 26 is connected to a seat operating switch 40 (i.e., an operating portion) that is operated by an occupant to adjust the reclining angle of the seat back 44 and a lengthwise position of the vehicle seat 42 (i.e., seat slide position) and the like. The seat operating switch 40 is provided on the side of the vehicle seat 42, as shown in FIG. 2A, for example. Also, the seat operating switch 40 includes a switch 40A used to adjust the reclining angle of the seat back 44, and a switch 40B used to adjust the lengthwise position of the vehicle seat 42 (i.e., seat slide position), as shown in FIG. 2B.

The motor 18 for driving the reclining actuator 14 is connected to the motor drive circuit 28 and is driven by this motor drive circuit 28. The motor 18 drives the reclining mechanism for adjusting the reclining angle of the seat back 44. Also, the driving speed of the motor 18 is varied according to the current supplied from the motor drive circuit 28 and the like.

The current monitoring circuit 30 detects the current supplied to the motor 18 from the motor drive circuit 28, and outputs a detection value to the microcomputer 16. The microcomputer 16 then controls the rotation speed of the motor 18 and the like based on this detection value of the current monitoring circuit 30.

The sensor 20 of the reclining actuator 14 is connected to the sensor input circuit 32, and a detection value of this sensor 20 is output to the microcomputer 16.

In this embodiment, the collision predicting ECU 46 (i.e., a collision predicting portion) that predicts a collision is connected as one of the various ECUs 38 to the vehicle information input circuit 24, as shown in FIG. 1.

Figure 3:
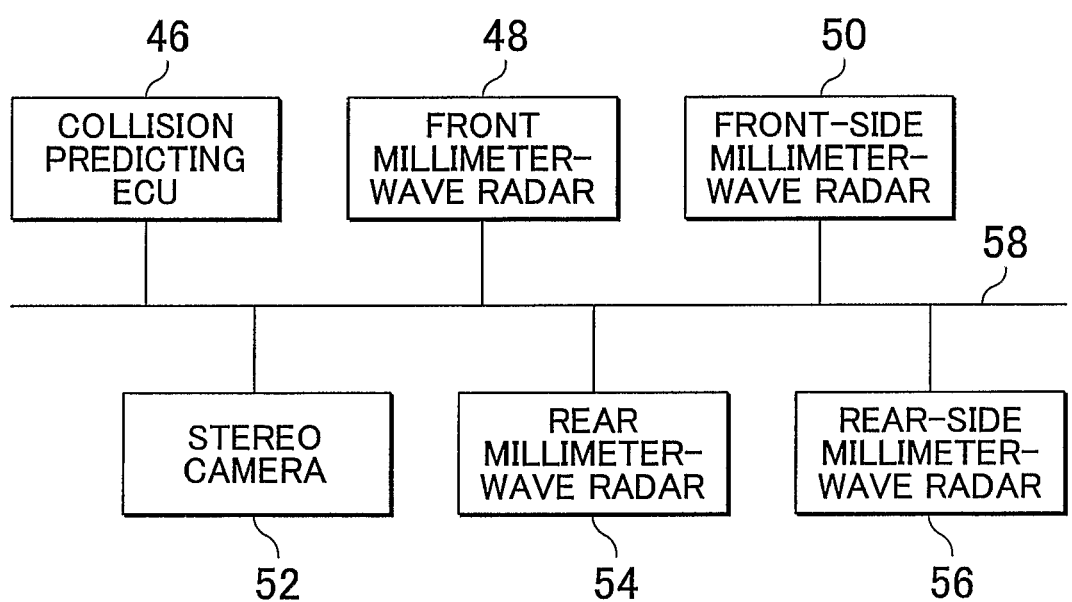
FIG. 3 is a block diagram of one example of a collision predicting ECU and a structure used for determining a collision.

The collision predicting ECU 46 is connected to a bus 58, as shown in FIG. 3. Also connected to the bus 58 are a front millimeter-wave radar 48 for detecting the distance to an obstacle in front of the host vehicle, a front-side millimeter-wave radar 50 for detecting the distance to an obstacle to the side in front of the host vehicle, a stereo camera 52 that captures an image of the area in front of the host vehicle, a rear millimeter-wave radar 54 for detecting the distance to an obstacle in back of the host vehicle, and a rear-side millimeter-wave radar 56 for detecting the distance to an obstacle to the side in back of the host vehicle.

The front millimeter-wave radar 48, the front-side millimeter-wave radar 50, the stereo camera 52, the rear millimeter-wave radar 54, and the rear-side millimeter-wave radar 56 monitor the area around the host vehicle and output the monitoring results to the collision predicting ECU 46.

The front millimeter-wave radar 48 is provided near the center of the front grille, for example. Also, the front-side millimeter-wave radar 50 is provided near each end in the width direction in the front bumper, for example. The front millimeter-wave radar 48 and the front-side millimeter-wave radar 50 emit millimeter waves to the front and the front-side of the host vehicle, respectively, and receive the radio waves that have been reflected off of an object. The front millimeter-wave radar 48 and the front-side millimeter-wave radar 50 are provided to measure the relative speed and distance from the host vehicle to the object, for example, based on the travel time of the radio waves and the frequency difference that occurs due to the Doppler effect, and the like. Also, the rear millimeter-wave radar 54 and the rear-side millimeter-wave radar 56 are provided in the rear bumper or the like. The rear millimeter-wave radar 54 and the rear-side millimeter-wave radar 56 emit millimeter waves to the rear and the rear-side of the host vehicle, respectively, and receive the radio waves that have been reflected off of an object. The rear millimeter-wave radar 54 and the rear-side millimeter-wave radar 56 are provided to measure the relative speed and distance from the host vehicle to the object, for example, based on the travel time of the radio waves and the frequency difference that occurs due to the Doppler effect, and the like.

The stereo camera 52 is provided on an upper portion of the front windshield inside the vehicle cabin in a position near the center in the vehicle width direction. The stereo camera 52 is provided to capture an image of the area in front of the host vehicle, detects an obstacle in front of the vehicle, and measures the distance from the host vehicle to that obstacle. Incidentally, because the distance from the host vehicle to an obstacle is able to be detected using the front millimeter-wave radar 48 and the front-side millimeter-wave radar 50 and the like, the stereo camera 52 may be omitted.

The collision predicting ECU 46 obtains the detection values from the front millimeter-wave radar 48, the front-side millimeter-wave radar 50, the stereo camera 52, the rear Millimeter-wave radar 54, and the rear-side millimeter-wave radar 56, and predicts whether there will be a collision. Since various well-known technologies can be employed to predict a collision, a detailed description will be omitted. For example, the collision predicting ECU 46 obtains the relative speed from the change in distance from the host vehicle to the obstacle based on the detection values from the front millimeter-wave radar 48, the front-side millimeter-wave radar 50, the stereo camera 52, the rear millimeter-wave radar 54, and the rear-side millimeter-wave 56, and calculates the predicted time-to-collision. If the predicted time-to-collision t that is calculated is within a preset time, the collision predicting ECU 46 determines that a collision is imminent.

In the vehicle seat control apparatus 10 structured as described above, the reclining angle of the seat back is adjusted to match a preset target angle if a collision is predicted by the collision predicting ECU 46. As a result, at the time of collision, the posture of the occupant will be appropriate, thus enabling an occupant restraint device such as a seat belt or an air bag apparatus to reliably protect the occupant.

More specifically, when the collision predicting ECU 46 predicts a collision, it outputs a command signal to the seat control ECU 12. This command signal is a signal requesting that the driving speed of the motor 18 be increased to a fast first speed. Then the seat control ECU 12 controls the motor drive circuit 28 to control the motor 18 so that the driving speed of the motor 18 comes to match the first speed that is faster than the speed (i.e., a second speed) of the motor 18 when the seat is adjusted normally (i.e., when the seat is adjusted by operating the seat operating switch 40).

When the command signal is output by the collision predicting ECU 46 and the motor 18 is controlled at the first speed by the seat control ECU 12, the reclining angle of the seat back 44 continues to be adjusted at fast (i.e., at a high rate of speed) until it matches the preset target angle, which may be annoying to the occupant.

Therefore, in this embodiment, if the occupant operates the seat operating switch 40 when a command signal is output by the collision predicting ECU 46 and the motor 18 is being controlled, the seat control ECU 12 controls to reduce the driving speed of the motor 18 to the second speed which is slower than the first speed and drives the motor 18 according to the operation of the seat operating switch 40.

Figure 4:
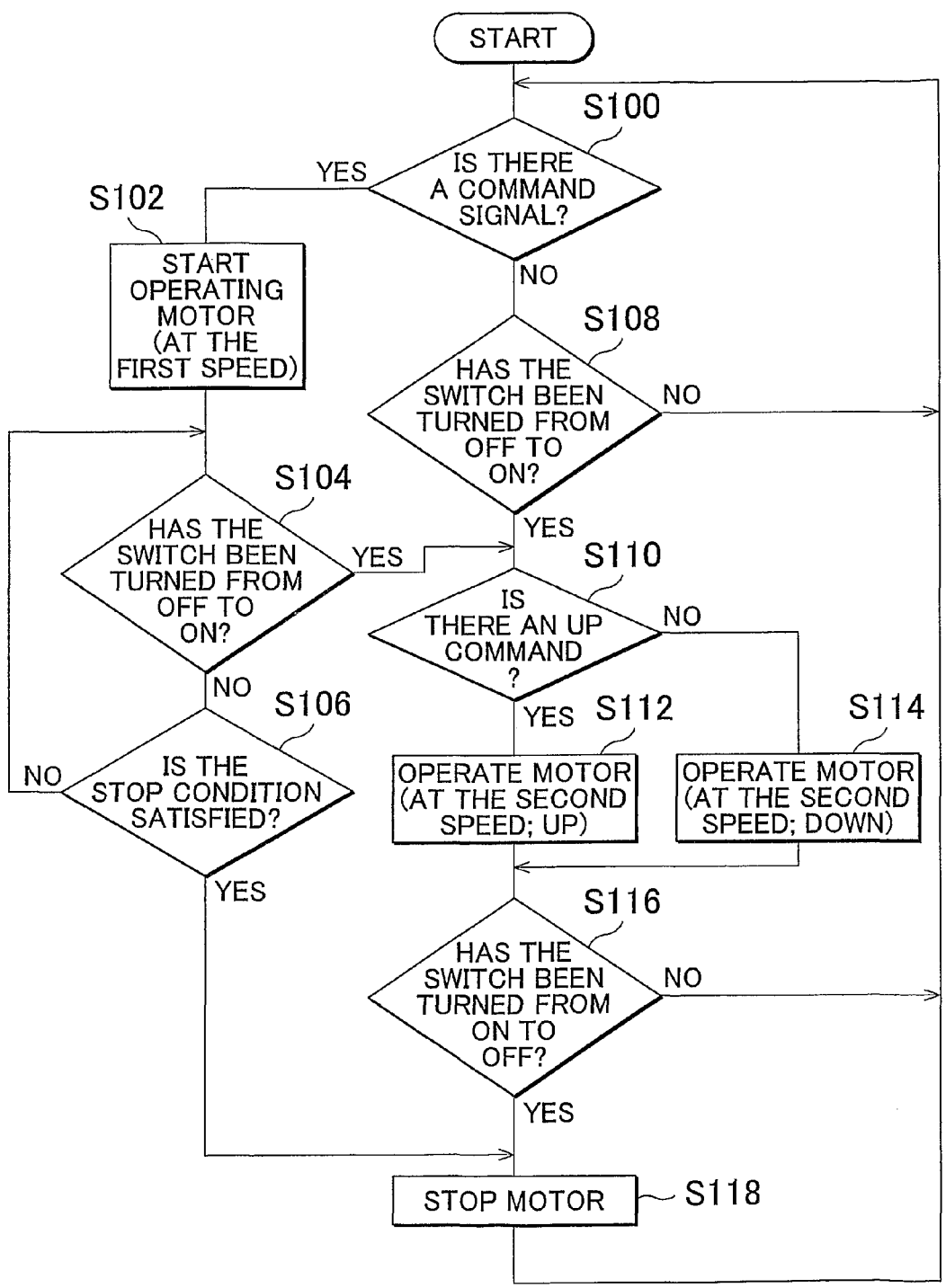
FIG. 4 is a flowchart illustrating a routine executed by a seat control ECU of the vehicle seat control apparatus according to the first embodiment of the invention.

Continuing on, a routine executed by the seat control ECU 12 of the vehicle seat control apparatus 10 will be described. FIG. 4 is a flowchart illustrating a routine executed by the seat control ECU 12 of the vehicle seat control apparatus 10 according to the first embodiment. Incidentally, in the routine in FIG. 4, the seat control ECU 12 obtains the detection value from the sensor 20 via the sensor input circuit 32 and uses it to determine whether the reclining angle matches a preset target angle. If the reclining angle does not match the target angle, the routine starts. Here, the target angle may be a target angle range that has a predetermined angle range.

First in step 100, it is determined whether there is a command signal. This determination is made by the seat control ECU 12 determining whether a command signal for operating the motor 18 at the first speed has been input via the vehicle information input circuit 24 as a result of a prediction by the collision predicting ECU 46 that there will be a collision. If the determination is yes, then the process proceeds on to step 102. If, on the other hand, the determination is no, then the process proceeds on to step 108. Incidentally, when the detection value from the sensor 20 is obtained via the sensor input circuit 32 and the reclining angle based on that detection value is equal to the preset target angle (or when the detected reclining angle is within the target angle range), the routine ends without operating the motor 18, even if a command signal to operate the motor 18 at the first speed has been output.

In step 102, the motor 18 starts to be operated at high speed. That is, the seat control ECU 12 controls the motor drive circuit 28 to drive the motor 18 at the first speed. For example, when the seat is adjusted by an operation of the seat adjusting switch 40, the current value applied to the motor 18 is set to 50% of the maximum current value, and when a command signal to operate the motor 18 at high speed is output, the motor 18 is driven at the first speed by applying 100% of the current value (i.e., the maximum current value) to the motor 18. After step 102, the process proceeds on to step 104.

In step 104, it is determined whether the seat operating switch 40 has been turned from off to on. If the determination is no, the process proceeds on to step 106. If, on the other hand, the determination is yes, the process proceeds on to step 110.

In step 106, it is determined whether a preset stop condition is satisfied. In this determination, for example, the seat control ECU 12 obtains the detection value from the sensor 20 via the sensor input circuit 32 and determines whether the detected reclining angle matches the preset target angle, whether a preset period of time has passed since the motor 18 started to operate at high speed, and whether the motor load has become equal to or greater than a preset load due to, for example, an object being caught in the seat adjusting mechanism or the like. If all of these determinations are no, the process returns to step 104 and the steps described above are repeated. However, if even one of these determinations is yes, the process proceeds on to step 118.

On the other hand, in step 108, it is determined whether the seat operating switch 40 has been turned from off to on. If the determination is no, the process returns to step 100 and the steps described above are repeated. If, on the other hand, the determination is yes, the process proceeds on to step 110.

In step 110, it is determined whether the change in the state of the seat operating switch 40 from off to on is indicative of an UP command (i.e., a command to raise the seat back 44) or a DOWN command (i.e., a command to recline the seat back 44). If the command is an UP command, the determination is yes and the process proceeds on to step 112. If, on the other hand, the command is a DOWN command, the determination is no and the process proceeds on to step 114.

In step 112, the motor 18 is driven at the second speed which is slower than the first speed to raise the seat back 44. That is, the seat control ECU 12 controls the motor drive circuit 28 to drive the motor 18 at slow speed and move the seat back 44 up to reduce the reclining angle. The motor drive circuit 28 decreases the driving speed of the motor 18 so that it is slower than it is when the motor 18 is driven at the first speed based on the command signal, by setting the current value that is applied to the motor 18 to 50% of the maximum current value, for example. Incidentally, if there is an UP command while the motor 18 is being driven at the first speed in response to a command signal and the motor 18 is operating in the direction (i.e., a first direction) to recline the seat back 44, operation of the motor 18 may be reversed (i.e., to a second direction) to raise the seat back 44 after first decreasing the driving speed of the motor 18 to the second speed, and then the motor 18 may continue to be operated at the second speed. In this case, when returning the reclining angle to the angle before the motor 18 had been operated, the motor 18 can be slowed, reversed, and stopped by a control sequence. Therefore, the reclining angle of the seat back 44 can be returned to the angle before the motor 18 had been operated, or the reclining angle of the seat back 44 can be simply adjusted, by a single operation, which simplifies the operation. Moreover, the direction in which the motor 18 is operating is reversed after first decreasing the driving speed of the motor 18 from the first speed to the second speed. As a result, annoyance to the occupant caused by the direction of movement of the seat back 44 suddenly reversing is able to be minimized. Also, the reclining angle of the seat back 44 can be returned to the angle before the motor 18 had been operated, or the reclining angle of the seat back 44 can be simply adjusted, by a single operation, which simplifies the operation, even if the motor 18 is operated at the second speed after simply reversing the direction in which the motor 18 is operating to the direction that raises the seat back 44 (i.e., the second direction) without decreasing the driving speed of the motor 18. Incidentally, in this specification, the first direction refers to the direction before the direction in which the motor 18 is operating has been reversed, and the second direction refers to the direction after the direction in which the motor 18 is operating has been reversed. After step 112, the process proceeds on to step 116.

Also, in step 114, the motor 18 is driven at the second speed to recline the seat back 44. After step 114, the process proceeds on to step 116. That is, the seat control ECU 12 controls the motor drive circuit 28 to move the seat back 44 downward so that the reclining angle increases. The motor drive circuit 28 decreases the driving speed of the motor 18 so that it is slower than it is when the motor 18 is driven at the first speed based on a command signal, by setting the current value that is applied to the motor 18 at 50% of the maximum current value, for example. Incidentally, if there is a DOWN command while the motor 18 is being driven at the first speed, which is faster than the second speed, in response to a command signal and the motor 18 is operating in the direction (i.e., the first direction) to raise the seat back 44, operation of the motor 18 may be reversed (i.e., to the second direction) to recline the seat back 44 after first decreasing the driving speed of the motor 18 to the second speed, and then the reclining angle of the seat back 44 may be returned to the angle before the motor 18 had been operated, or the reclining angle of the seat back 44 can be simply adjusted, while continuing to operate the motor 18 at the second speed. In this case, when returning the reclining angle to the angle before the motor 18 had been operated, the motor 18 can be slowed, reversed, and stopped by a control sequence. Therefore, the reclining angle of the seat back 44 can be returned to the angle before the motor 18 had been operated, or the reclining angle of the seat back 44 can be simply adjusted, by a single operation, which simplifies the operation. Moreover, the direction in which the motor 18 is operating is reversed after first decreasing the driving speed of the motor 18 from the first speed to the second speed. As a result, annoyance to the occupant caused by the direction of movement of the seat back 44 suddenly reversing is able to be minimized. Also, the reclining angle of the seat back 44 can be returned to the angle before the motor 18 had been operated, or the reclining angle of the seat back 44 can be simply adjusted, by a single operation, which simplifies the operation, even if the motor 18 is operated at the second speed after simply reversing the direction in which the motor 18 is operating to recline the seat back 44 (i.e., the second direction) without decreasing the driving speed of the motor 18 from the first speed to the second speed. After step 114, the process proceeds on to step 116.

In step 116, it is determined whether the seat operating switch 40 has been turned from on to off. If the determination is no, the process returns to step 100 and the steps described above are repeated. If, on the other hand, the determination is yes, the process proceeds on to step 118.

In step 118, operation of the motor 18 is stopped, after which the process returns to step 100 and the steps described above are repeated.

In this way, as a result of the seat control ECU 12 executing this routine, the driving speed of the motor 18 is decreased from the first speed to the second speed by operating the seat operating switch 40 and the motor 18 is driven according to that operation of the seat operating switch 40, even while the reclining angle of the seat back 44 is being adjusted at high speed to the target angle at which an occupant restraint device is able to appropriately restrain the occupant when a collision has been predicted by the collision predicting ECU 46, thus minimizing annoyance to the occupant.

Figure 5:
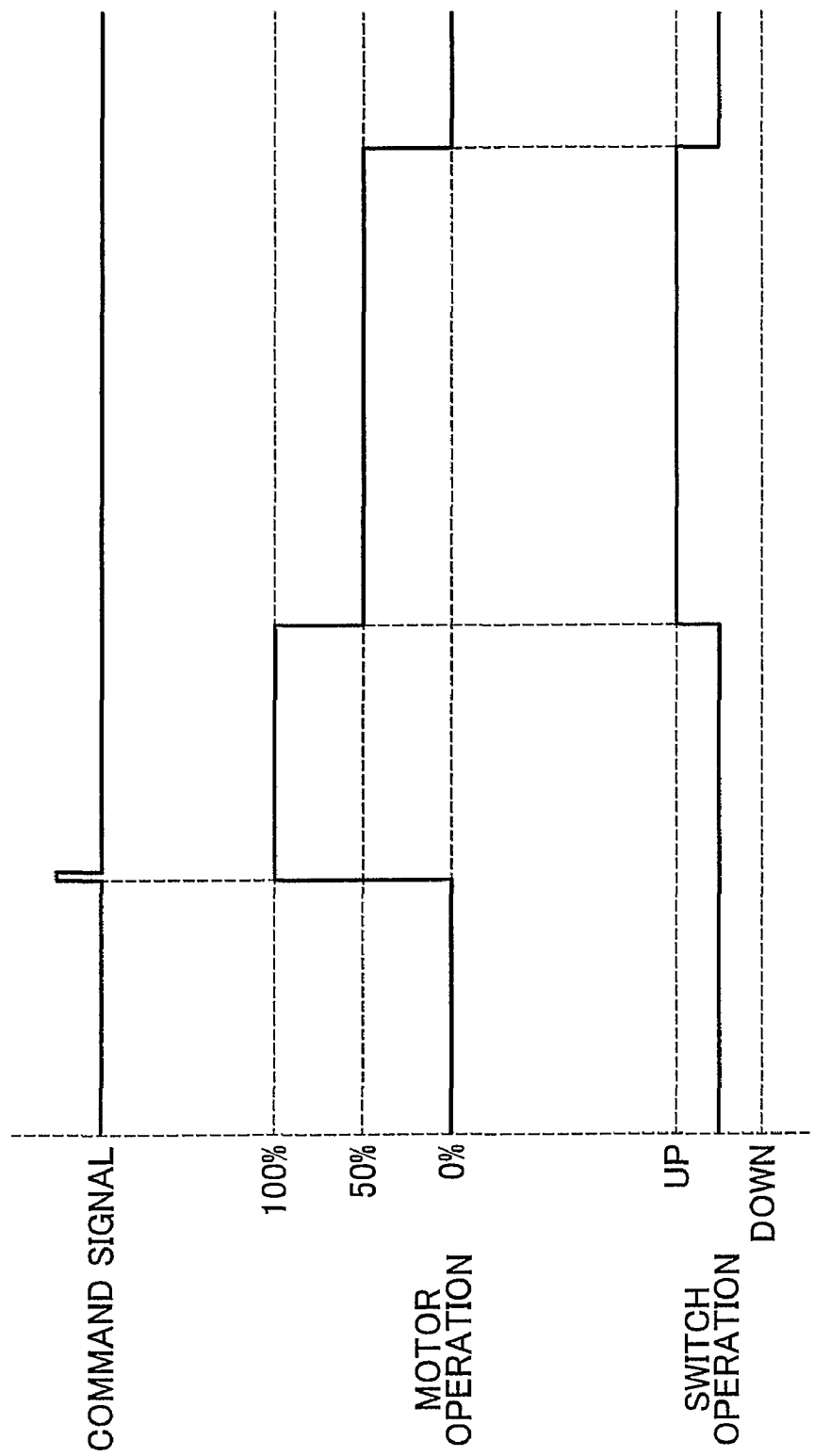
FIG. 5 is a view of one example of control performed by the vehicle seat control apparatus according to the first embodiment of the invention.

For example, as shown in FIG. 5, when a command signal is output by the collision predicting ECU 46, the motor 18 is driven by the maximum current value (100%) so that it operates at the first speed. Then when the seat operating switch 40 is operated (i.e., an UP command in FIG. 5), the motor 18 is driven by a current value that is 50% of the maximum current value so that it operates at the second speed. Then the motor 18 stops when the switch operation ends. As a result, the seat back 44 can be operated according to a command by the occupant, so annoyance to the occupant can be minimized.

Figure 6:
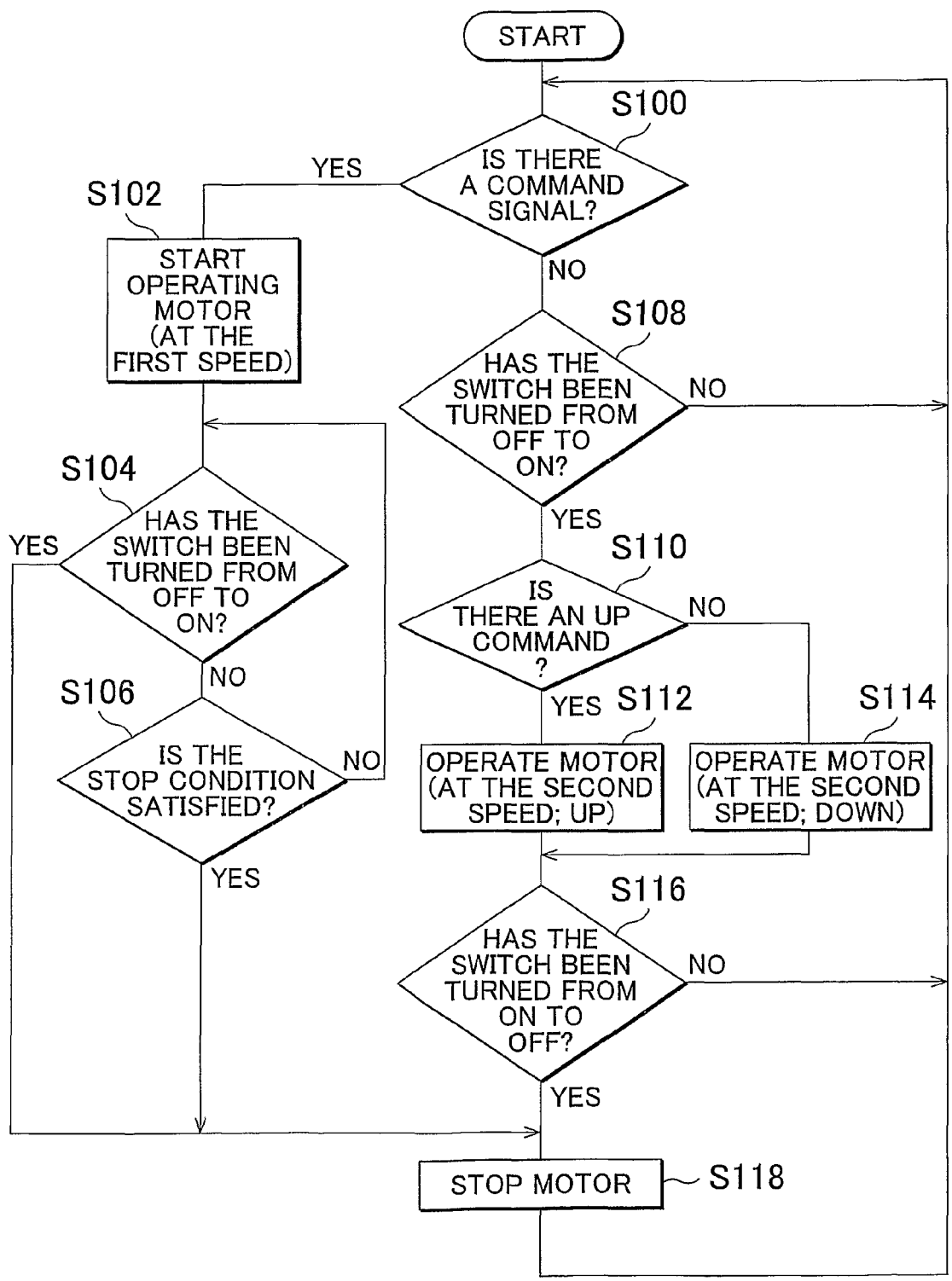
FIG. 6 is a flowchart illustrating a routine executed by a seat control ECU of a vehicle seat control apparatus according to a second embodiment of the invention.

Incidentally, in the embodiment described above, if the seat operating switch 40 is operated while the motor 18 is operating at the first speed due to a request for high speed operation of the motor 18 from the collision predicting ECU 46, the motor 18 switches to operate at the second speed which is slower than the speed at which the motor 18 is driven when it is operating at high speed. However, the invention is not limited to this. That is, if the seat operating switch 40 is operated while the motor 18 is operating at the first speed due to a request for high speed operation of the motor 18 from the collision predicting ECU 46, operation of the motor 18 may also be stopped. For example, if it is determined that the seat operating switch 40 has been turned from off to on in step 104 (i.e., YES in step 104) after the motor 18 starts to be operated at high speed in step 102 in FIG. 4, the process may then proceed on to step 118 where the motor 18 is immediately stopped, as in a second embodiment of the invention shown in FIG. 6. Also, when the motor 18 is stopped in step 118 at this time, the motor 18 may be stopped after first being slowed to a speed that is slower than the speed at which the motor 18 is operated when it is driven at high speed.

Also, in the embodiment described above, the invention is applied to a mechanism that adjusts the reclining angle of the seat back 44 when a collision is predicted, but the invention is not limited to this. For example, the invention may also be applied to a mechanism that closes a power window or a sun roof or the like when a collision is predicted.

The invention claimed is:

1. A vehicle control apparatus comprising:
a drive unit that drives a mechanism provided in a vehicle;
an operating portion that is operated by an occupant and instructs the drive unit to drive;
a collision predicting portion that predicts a collision; and
a control portion that controls the drive unit, wherein
the control portion controls the drive unit to: (i) place the mechanism in a predetermined state when the collision is predicted by the collision predicting portion, and (ii) vary a driving speed of the drive unit when the operating portion is operated while the drive unit is being controlled upon prediction of the collision,
the control portion controls the drive unit at a first speed when the collision predicting portion predicts the collision, and decreases the driving speed of the drive unit to a second speed that is slower than the first speed when the operating portion is operated while the drive unit is being driven at the first speed,
the drive unit is structured so as to drive in a first direction and a second direction that is opposite the first direction,
the control portion controls so as to reverse a driving direction of the drive unit to the second direction after decreasing the driving speed of the drive unit from the first speed to the second speed, when there is a drive command to drive the drive unit in the second direction in response to operation of the operating portion while the drive unit is being driven in the first direction at the first speed, after the driving direction of the drive unit is reversed to the second direction, the control portion controls the drive unit such that the drive unit continues to be driven at the second speed, and the mechanism is returned to a state before being driven by the drive unit.

2. A vehicle control apparatus comprising:

a drive unit that drives a mechanism provided in a vehicle;

an operating portion that is operated by an occupant and instructs the drive unit to drive;

a collision predicting portion that predicts a collision; and a control portion that controls the drive unit, wherein the control portion controls the drive unit to: (i) place the mechanism in a predetermined state when the collision is predicted by the collision predicting portion, and (ii) vary a driving speed of the drive unit when the operating portion is operated while the drive unit is being controlled upon prediction of the collision, the control portion controls the drive unit at a first speed when the collision predicting portion predicts the collision, and decreases the driving speed of the drive unit to a second speed that is slower than the first speed when the operating portion is operated while the drive unit is being driven at the first speed, the drive unit is structured so as to drive in a first direction and a second direction that is opposite the first direction, the control portion controls so as to reverse a driving direction of the drive unit to the second direction after decreasing the driving speed of the drive unit from the first speed to the second speed, when there is a drive command to drive the drive unit in the second direction in response to operation of the operating portion while the drive unit is being driven in the first direction at the first speed, and after the driving direction of the drive unit is reversed to the second direction, the control portion controls the drive unit such that the drive unit continues to be driven, and the mechanism is returned to a state before being driven by the drive unit.

\* \* \* \* \*